June 28, 1927.

R. MANNL 1,633,706

X-RAY SCREEN FOR TAKING SKIAGRAMS

Filed July 9, 1925

Inventor:
Rudolf Mannl
by Emil Bönnekyhe
his attorney

Patented June 28, 1927.

1,633,706

UNITED STATES PATENT OFFICE.

RUDOLF MANNL, OF KARLSBAD, CZECHOSLOVAKIA.

X-RAY SCREEN FOR TAKING SKIAGRAMS.

Application filed July 9, 1925, Serial No. 42,593, and in Czechoslovakia July 11, 1924.

The present invention relates to X-ray screens, and has for its purpose to provide a screen in which small deviations from exact adjustment will not, as in screens heretofore proposed, cause large shadows to be apparent in the middle of the field of view.

According to this invention the height of the plates of an X-ray screen decreases toward the middle of the screen so that the plates are narrower in the middle than at the edges of the screen. As a result, the screen can be used even when its centering is not exact and this is of importance when the screen is adjusted by hand only.

Figure 1:
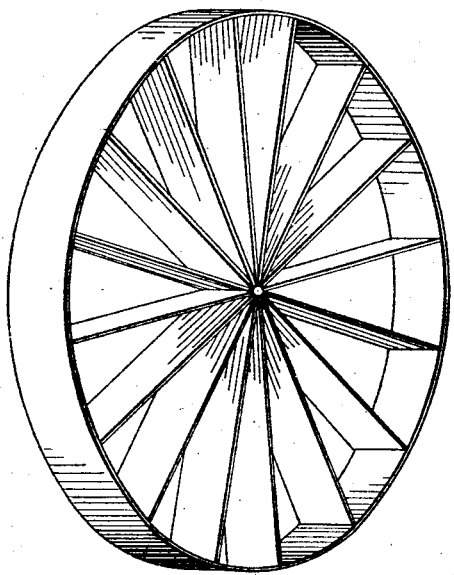
Figure 1 is a somewhat diagrammatic perspective view of a screen of well known type.
Figure 2:
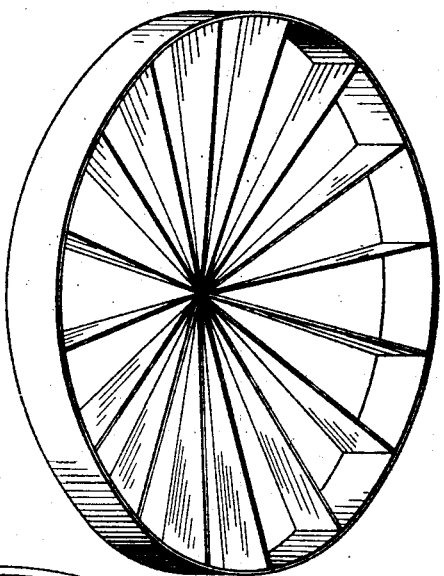
Fig. 2 is a similar view of a screen constructed in accordance with the present invention.

As can be seen from the well known screen of Fig. 1, the plates are of unvarying height from the edges of the screen to its center. However, in accordance with the present invention (Fig. 2), the plates are more permeable at the middle of the screen to the primary X-rays; for example, the material from which the plates are made is rendered more permeable to X-rays near to the middle of the screen by altering its mass, thickness or composition. When such a screen is turned about its axis the plate shadows wholly disappear without the appearance of points or concentric circles. The center point may even become invisible as, although the plates are spaced more closely together, they are more transparent. The invention is also applicable to screens such for example as spiral screens.

The embedding material for the plates is, in another embodiment of this invention, so selected that its permeability to X-rays is greater at the edges of the screen than at its middle point, which has also for effect to equalize the action of the screen at all portions.

Figure 3:
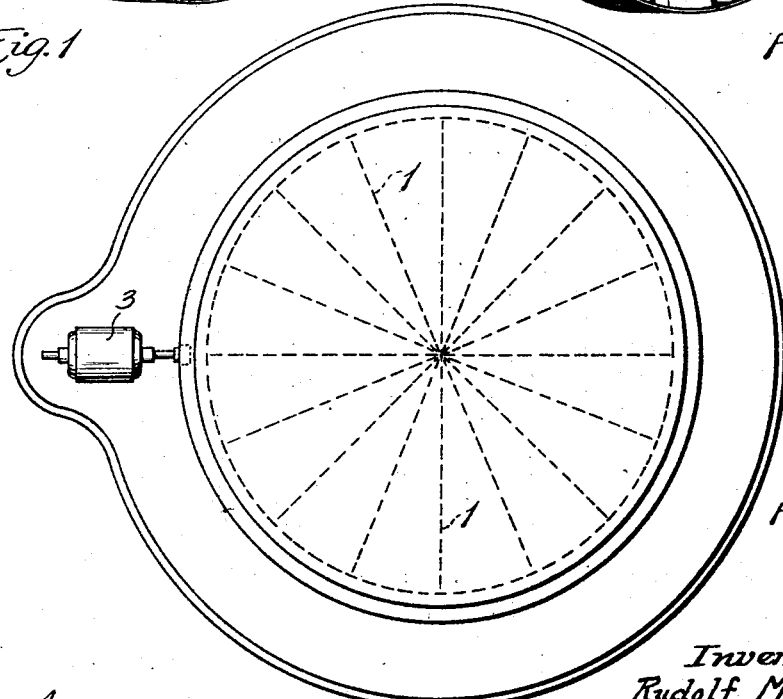
Fig. 3 is a perspective view and Fig. 4 a cross section of the screen mounted with the associated elements with which it is used.
Figure 4:
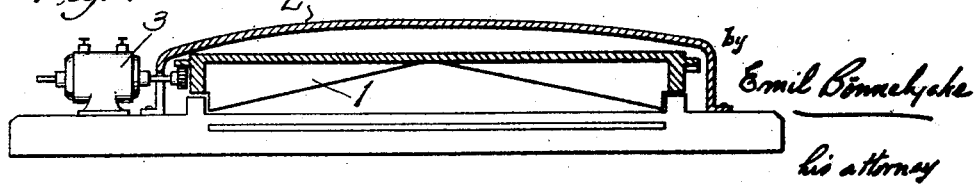

A practical way of carrying out the invention is illustrated in Figs. 3 and 4, where the screen is provided with radial plates 1, each of which has one edge sloped so as to be narrower at the middle of the sreen. Above the screen is placed a movable cover 2 permeable to X-rays and which is arched and permits the soft parts of the body illuminated to be compressed.

The screen is also provided with a well known rotating device comprising a pinion secured to the shaft of motor 3 and engaging an annular gear on the screen.

I claim:

1. An X-ray screen having plates converging in a common point, said plates being of decreasing height toward said point of convergence.

2. A screen as claimed in claim 1, in which the material of which the plates are made is of different quality at the center, so that the plates are more permeable near the middle of the field of view.

3. A screen as claimed in claim 1, having embedding material for the plates, and in which the X-ray permeability of said material is greater at the edges of the screen than at its middle point.

4. A screen as claimed in claim 1, provided with an arched protecting cover formed of a material permeable to X-rays.

In testimony whereof I have signed my name to this specification.

Dr. RUDOLF MANNL.